United States Patent [19]

Bele et al.

[11] Patent Number: 4,561,308

[45] Date of Patent: Dec. 31, 1985

[54] IMAGE DISPLAY PROCESS BY ULTRASOUNDS FROM AN ALIGNMENT OF TRANSDUCER ELEMENTS

[75] Inventors: Robert Bele, Chessy; Gilbert Micaletti, Lagny, both of France

[73] Assignee: CGR Ultrasonic, Meaux, France

[21] Appl. No.: 589,448

[22] Filed: Mar. 14, 1984

[30] Foreign Application Priority Data

Mar. 18, 1983 [FR] France ............... 83 04486

[51] Int. Cl.⁴ ............................................. G01N 29/04
[52] U.S. Cl. ...................................................... 73/626
[58] Field of Search ................... 73/626, 628; 128/660

[56] References Cited

U.S. PATENT DOCUMENTS

| | | | |
|---|---|---|---|
| 4,252,026 | 2/1981 | Robinson | 73/626 |
| 4,254,662 | 3/1981 | Kuroda et al. | 73/626 |
| 4,351,038 | 9/1982 | Alais | 73/626 |
| 4,395,912 | 8/1983 | Hassler | 73/626 |
| 4,462,092 | 7/1984 | Kawabuchi et al. | 73/626 |

FOREIGN PATENT DOCUMENTS

| | | |
|---|---|---|
| 31510 | 12/1980 | European Pat. Off. |
| 2328205 | 10/1976 | France |
| 2472753 | 12/1979 | France |
| 2507078 | 6/1981 | France |
| 2508665 | 6/1981 | France |

*Primary Examiner*—Anthony V. Ciarlante
*Attorney, Agent, or Firm*—Pollock, Vande Sande & Priddy

[57] ABSTRACT

A process of utilizing ultrasound for acquiring data representative of the internal portions of a structure and the display of the data thus obtained. This process includes the emitting of sequences of ultrasound to the structure under consideration and receiving therefrom corresponding echoes. For each sequence two groups of transducer elements are selected for generating ultrasound beams of possible N different focal characteristics sequentially. The ultrasound beams alternate from one group to the other except when a given beam corresponds to the most distant focal zone. In that case, the succeeding emission is carried out without alternating, i.e., the emission is generated from the same group.

12 Claims, 7 Drawing Figures

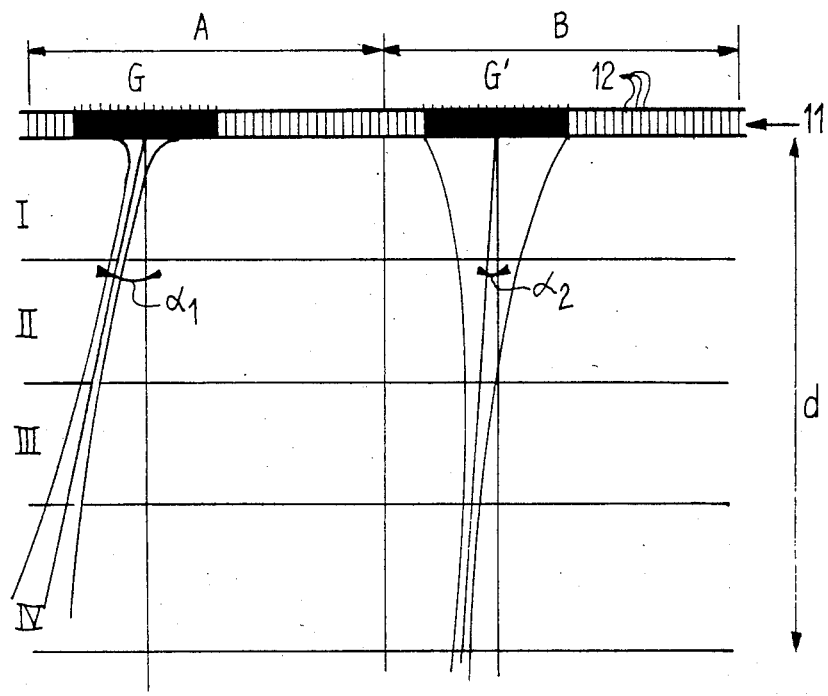
FIG_1
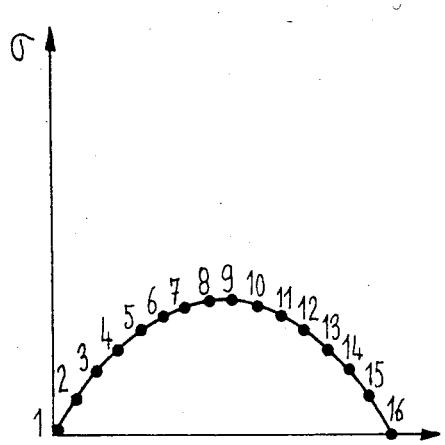
FIG_2-a
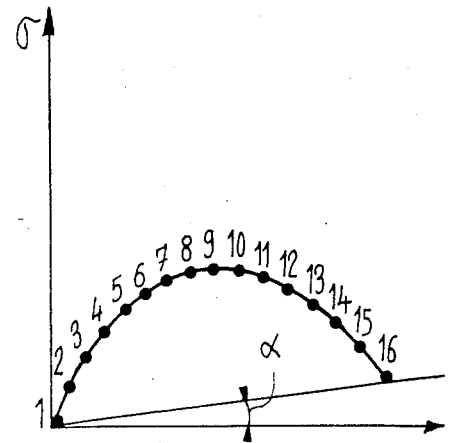
FIG_2-b

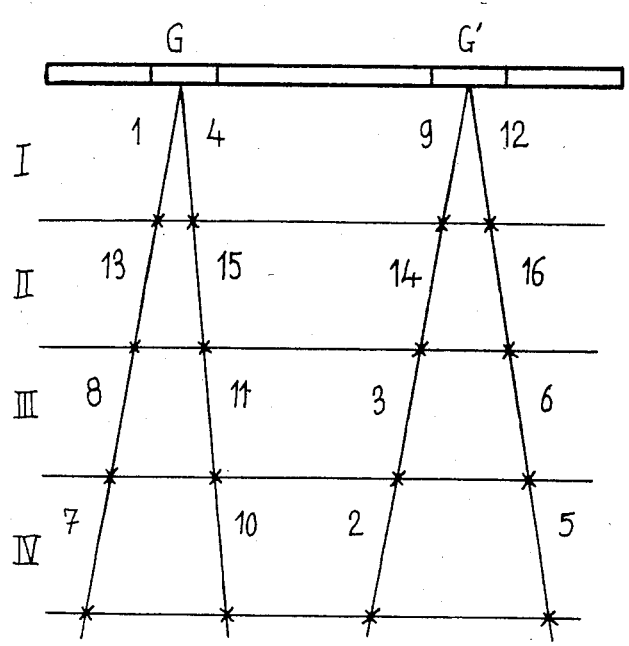
FIG_3
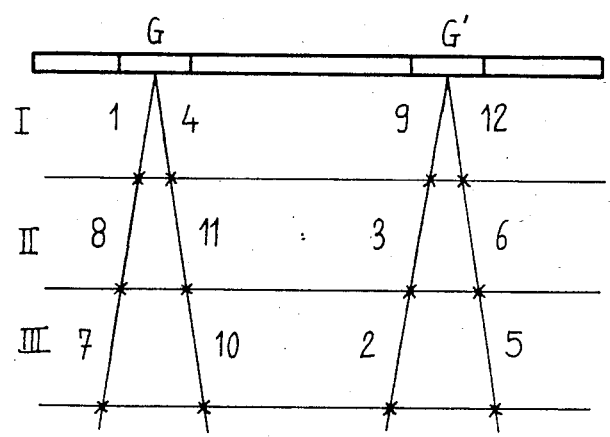
FIG_4
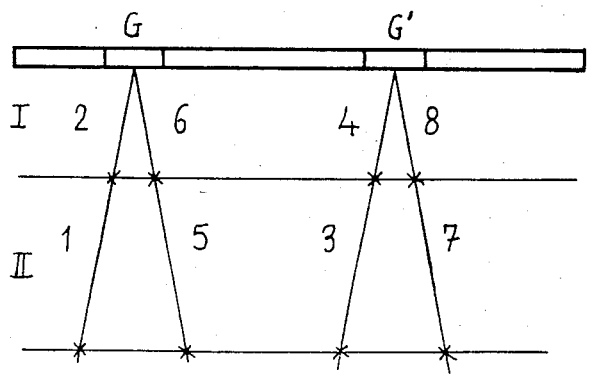
FIG_5

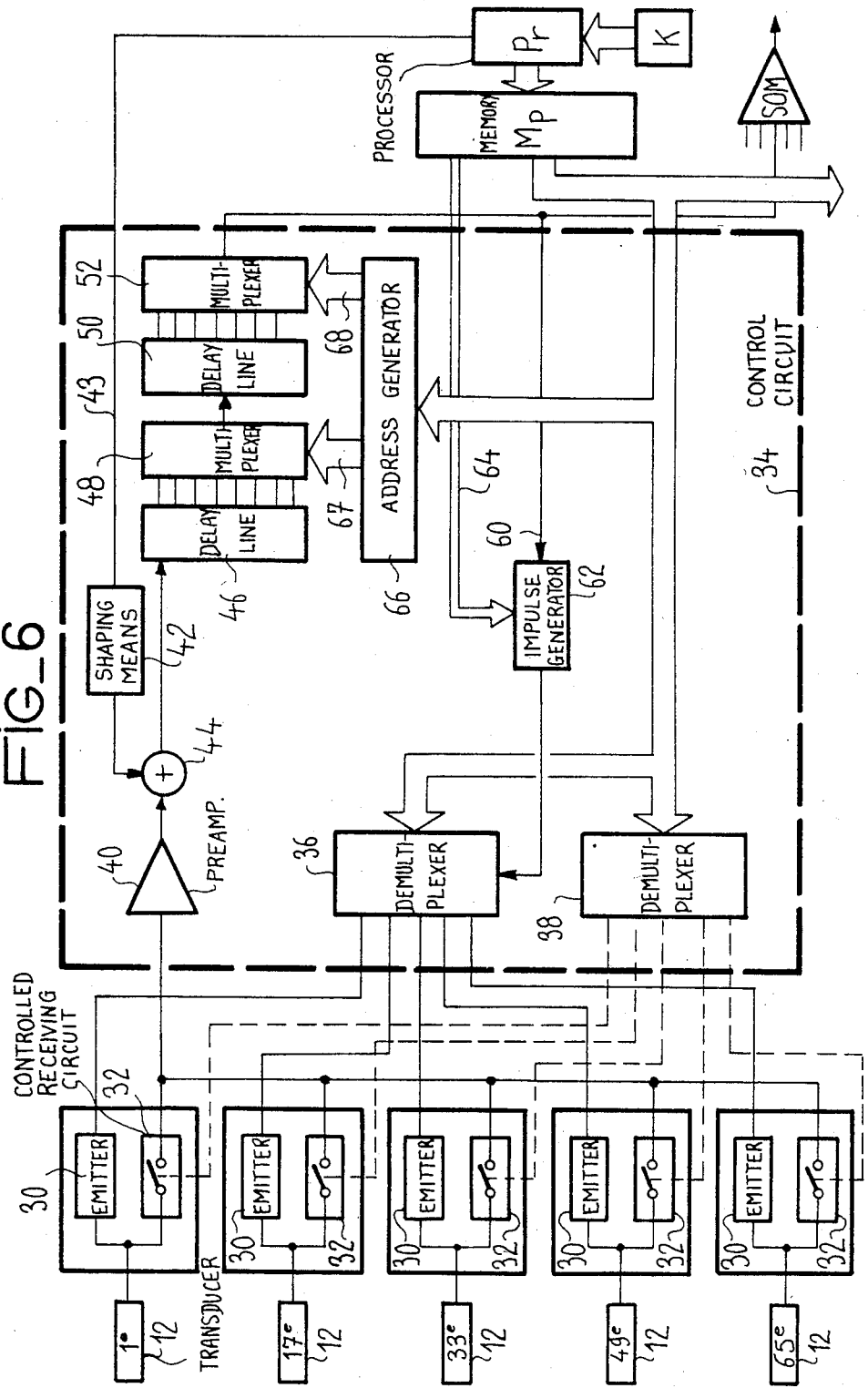

IMAGE DISPLAY PROCESS BY ULTRASOUNDS FROM AN ALIGNMENT OF TRANSDUCER ELEMENTS

BACKGROUND OF THE INVENTION

The invention concerns an image display process which utilizes ultrasounds from an alignment of transducer elements; it concerns, more particularly, a sequential arrangement of shots of ultrasound beams to a structure to obtain the best possible compromise between the quality of the image thus obtained and the rapidity with which the process is achieved.

BRIEF DESCRIPTION OF THE PRIOR ART

It is known that an image along a chosen section of a structure can be formed by generating a succession of ultrasound beams from an emitting strip subdivided into a plurality of transducers comprising piezo-electric elements, disposed side by side, and by collecting and processing the echoes sent back by the structure towards the same elements. Thus, the transducers are used sequentially for emitting and receiving. The sequential emitting and receiving consists in generating the ultrasound beams in such a way as to explore the structure line by line and to use the echoes received, or a portion thereof, as video signals of a television display. In order to obtain a suitable lateral resolution (resolution in the direction parallel to the strip), it is necessary that each beam emitted has a section as small as possible and that this section is as constant as possible along all the exploration depths. This difficulty was partially overcome by generating, at each time, each beam by exciting a group of adjacent elements with a predetermined delay law; that is, the two extreme elements being excited first, the two adjacent elements are excited next, and so on up to the central elements of the group. The delay law chosen allows the process to obtain a beam narrow enough on a certain part of its length to give rise to a good lateral definition, at least along one part of the required exploration depth. It is also known that an image of a structure can be formed by varying the focal pattern of the beam at emission for a given shot. This can be advantageously done by decomposing the plane section into several parallel bands, or focal zones, and causing the bands (focal zones) to correspond to the emission the ultrasound beams having the respective optimal focal characteristics for these zones. Thus, if the cut to be visualized is divided into four focal zones, it will be necessary to generate for each line of the final image four beams having different focal characteristics; that is, the one line of the final image is reconstituted from the echoes corresponding to the "useful" portions of the narrow sections of the four beams having been emitted according to the direction of the line. It is understood that in these conditions, acquisition time of the image is multiplied by the number of focal zones chosen. In other words, as this acquisition time is dependent on the propagation speed of the ultrasonic waves in the structure, it is necessary to await the time necessary for receiving the echoes between two consecutive shots. To increase the rhythm of the images, it was proposed in European patent application No. 0 031 510 that ultrasonic waves not be emitted at a constant period but rather, be emitted immediately after acquisition of the echoes issuing from the focal zone previously explored. This process has the drawback of an important recurrence diaphony during the successive shots, i.e. bursts, of beams since the echoes corresponding to one given shot hereinafter to be interchangeable with burst are still very significant at the moment of acquisition of the echoes of the following burst, and consequently, the former bursts are superimposed on the later shots. Thus, in practice, it is thus necessary to wait a supplementary time interval between the bursts. This causes a decrease of the rhythm of the images with respect to what could be hoped for from such an image formation process.

Furthermore, efforts were made to reduce the recurrence diaphony problems by proceeding to the acquisition of the image by ultrasound bursts separated from one another in the section, for example, by selecting two groups of transducers to generate two beams separated by about half the length of the strip and by acquiring the useful echoes from focalized bursts carried out alternately from two groups. Such a process is described, for example, in French patent application No. 81-12 843 filed in the name of the applicant.

SUMMARY OF THE INVENTION

The present invention proposes, among others, an advantageous combination of earlier solutions set out hereinabove, as well as a sequential arrangement particularly allowing the simplifying of the control software and switchable means necessary to suitably excite the different transducer elements while minimizing the time losses due to the commutations between the two groups of selected elements.

In this spirit, the invention concerns a display process which includes the emitting of sequences of ultrasound bursts to a structure and receiving therefrom corresponding echoes. The emitting and receiving are performed from an alignment of transducer elements coupled to a structure. The display process, for emitting, includes the generating of predetermined sequences of focalized beams from, each time, two groups of transducer elements selected respectively in two sections of the alignment, the groups differing by at least one element at each sequence in such a way as to realize a sweeping of such beams. Each sequence comprises a predetermined number and series of emitting beams from elements of the two selected groups. The beams are shaped according to N possible focal patterns associated respectively to N areas or focal zones of the alignment, N being a chosen integer, wherein the beams are essentially generated alternately from one group to the other except when one given beam corresponds to the focal zone positioned the furthest from the alignment.

Thus, when the acquisition of the useful data is proceeded with the furthest positioned focal zone, it is possible to emit the following beam from the same group. Preferably, each emission corresponding to the furthest positioned focal zone is followed by an emission of substantially the same direction but with a focal pattern corresponding to the focal zone adjacent to the same furthest positioned focal zone.

Another important data of the problem is the number of lines constituting the image. It is obvious that in order to improve the sharpness of the image it is necessary to increase the number of lines. A first solution consists, for a strip of a given length, in increasing the number of piezo-electric transducer elements. Given that these elements are obtained by cutting ceramic with a fine saw, it is obvious that the reduction in length of the piezo-electric elements encounters difficulties imposed by technological limits. In order to increase the number of lines, it has been proposed to emit beams not according to a direction perpendicular to the alignment of the transducers but in directions inclined in the section plane and symmetrical with respect to this normal direction. This process is, for example, described in U.S. Pat. No. 4,070,905. Thus, a single group of elements is capable of obtaining several adjacent lines of the image. The invention also concerns the incorporation of a technique known as "microangulation" in the sequential burst arrangement process. This means that, for each group of elements chosen at each sequence, bursts are emitted during the sequence, according to the two possible directions, substantially symmetrical with respect to a normal direction of the alignment and forming with it a small angle. It is advantageous to combine this microangulation process with the focalization mode of the beams since the microangulation is carried out by the same means as focalization, i.e. by consequently adapting the aforesaid delay laws between the elements of a selected group. On the other hand, the microangulation technique is improved by the fact that the emitting angle is that much smaller as the corresponding focal zone is distanced further from the alignment of transducers.

BRIEF DESCRIPTION OF THE DRAWINGS

The invention will be better understood and other advantages will appear more evident from reading through the following description of several sequential shot arrangement processes, according to the invention in an image system using a strip sounding probe or sonde, given simply by way of non-limitative example with reference to the annexed drawings, in which:

FIG. 1 is a diagram of a strip sonde placed in front of a structure to elaborate an image along a section of said structure divided into four focal zones;

FIG. 2a is a graph illustrating a delay law suitable to generate a beam of a predetermined focal disposition;

FIG. 2b is a group illustrating the delay law to generate a beam substantially identical to the foregoing one, with microangulation;

FIG. 3 is a diagram illustrating a preferred sequential mode in the case of a section divided into four focal zones;

FIG. 4 is a diagram illustrating a preferred sequential mode in the case of a section divided into three focal zones;

FIG. 5 is a diagram illustrating a preferred sequential mode in the case of a section divided into two focal zones;

FIG. 6 is a partial block diagram of an electronic processing unit capable of reconstituting an image with a sequential shot arrangement according to the embodiment.

DETAILED DESCRIPTION OF THE DRAWINGS

FIG. 1 represents an echography sonde formed essentially of an alignment 11 of piezo-electric transducer elements 12. This sonde is placed in front of the structure the section of which it is required to observe. The two halves of this section represent the general aspect of the ultrasound beams that can be emitted from the strip with different focal patterns. It will be noted that these beams only have the required fineness on one part of their length; that is, the required fineness is substantially smaller than the depth d of the image required. This is the reason why the section to be displayed has been cut into N areas (N=4, in the example) I, II, III and IV in the form of bands parallel to alignment 11 and more and more distanced, respectively, from it. These areas will be called "focal zones" hereinafter and the focal zones will always be numbered in increasing order from this strip. As it is known to give the beam a required focal pattern N focal dispositions are associated to N focal zones, respectively, in such a way that, as much as possible, the useful portion of the narrow section of the beam is situated in the corresponding focal zone. Thus, on FIG. 1, the ultrasound beam to the left of the drawing is the beam which has been selected for the first focal zone I, while the right-hand beam is that which has been selected for the fourth focal zone IV. The manner of generating such beams is known. It is necessary to excite not one, but a group of adjacent elements 12 with some predetermined delays between the elements.

Thus, FIG. 2a shows the delay law between the elements of a group of sixteen (the delay sigma being expressed as ordinate) in order to generate a beam perpendicular to the alignment 11. First of all, extreme elements 1 and 16 of the group are simultaneously excited. Next, elements 2 and 15 are excited simultaneously. Following that, elements 3 and 14 and so on up to two elements 8 and 9 of the center of the group are successively excited simultaneously. Furthermore, the number of elements to be excited in a group in order to obtain a given focal disposition is different according to the focalization depth required, i.e. according to the focal zone involved. As a general rule, in each group, a beam having a greater number of transducer elements (and an associated delay law) is generated corresponding to a focal zone distanced apart from alignment 11 than when a beam is generated corresponding to a focal zone close to this same alignment. In this spirit, the number of elements of a group in the context of the present description is the number of elements necessary to generate a beam associated to the most distant focal zone. Thus, FIG. 1 shows, marked in black, two groups of sixteen selected elements G and G' (for a given operating sequence that will be explained hereinafter) in two respective sections A, B of the alignment 11 each representing one half of the strip. Group G is used, according to the example, to generate a beam corresponding to a focal zone I; and in this case, only the eight central elements are effectively excited with suitable delays. On the other hand, group G' is used, according to the example, to generate a beam corresponding to a focal zone IV; and in this case, sixteen elements of the group are effectively excited with another adapted delay law. Therefore, in the specific example of FIG. 1, a selected group G or G' is always constituted by sixteen elements; and as N=4 (number of focal zones), four respective focal dispositions of the beam are associated to these four zones with sixteen elements being used to generate the beam associated to the fourth focal zone, twelve elements to generate the beam associated to the third focal zone, and eight elements to generate the beams respectively associated to the first and second focal zones. The elements that are not used for a particular focal disposition are those of the ends of the group so that the elements in use always form an assembly of adjacent elements.

Furthermore, with the aim of doubling the line densities for the same number of transducer elements, the ultrasound bursts along two possible directions from each group of elements G, G' selected for a determined sequence were conducted. More specifically, the two possible directions are substantially symmetrical with respect to the direction normal at the strip and define a small angle ($\pm\alpha_1$ or $\pm\alpha_2$) with respect to it. Angle $\alpha$ is small enough (it was deliberately accentuated on FIG. 1) so that upon display of the corresponding echoes, it is admissible that these echoes be displayed along two adjacent lines of the television receiver on which the image is reconstituted. This microangulation can be obtained by simple modification of the delay law defining the focal pattern.

FIG. 2b illustrates the transformation of the delay law of FIG. 2a in order to obtain a beam of substantially the same focal pattern emitted with a small angle $\alpha$ with respect to a direction normal to alignment 11. It will thus be understood that the microangulation of the beams is technologically realized with the same means as those that determine the required focal disposition, namely in practice, adjustable delay lines.

Each time that two groups such as G and G' have been selected, a burst sequence the number of which is equal to four times the number of the focal zones (this by reason of the above-mentioned microangulation) is ordered. The echoes recovered from this sequence reconstitute four lines of the image localized by pairs and situated respectively opposite sections A and B of alignment 11 at the center of the selected groups. Any new sequence is initialized by changing one element, each time, in each group in such a way as to sweep progressively all the strip. Thus, for example, for the sequence that follows for which groups G and G' are selected, it will be necessary to remove the element furthest to the left of each group (looking at FIG. 1) and to add one element to the right of each group in order to define the two new groups involved for this new sequence, and so on until the groups are displaced along the length of a half strip.

According to one important characteristic of the invention, the succession of bursts in a sequence is such that the beams are generated essentially alternately from one group to another, except when one given beam corresponds to a focal zone IV. When that occurs the succeeding shot is carried out from the same group and, according to a preferred sequence embodiment, each emission corresponding to the focal zone IV is followed by the emission of a beam of substantially the same direction but with a focal pattern corresponding to focal zone III.

Of course, this process is valid with or without microangulation, i.e. the sequence is foreseen so as to allow acquisition of two lines (shots perpendicular to the alignment) or four lines (shots $\pm\alpha$ on either side of the normal). For example, in the case of an image reconstruction of four focal zones a possible succession of shots is set out. Consider FIG. 3, where, for the sake of clarity, only the direction of the bursts (microangulation $\pm\alpha$) has been represented and where the ordered numerals of the bursts are indicated in each corresponding focal zone near the "useful" section of the associated beam. The characteristics of each beam emitted by the letter G or G' with subscript can thus be resumed. In this case, G or G' designates the group from which the beam is emitted, the first subscript indicates the row of the focal zone from the alignment and the second subscript (a or b) indicates the sense of the microangulation, i.e. the beams of substantially the same orientation in each group. Consequently, if the subscript a is allocated to a microangulation directed towards the left of FIG. 3 and the subscript b to a microangulation directed towards the right, the succession of bursts in a sequence is the following:

$G_{1a}$, $G'_{4a}$, $G'_{3a}$, $G_{1b}$, $G'_{4b}$, $G'_{3b}$, $G_{4a}$, $G_{3a}$, $G'_{1a}$, $G_{4b}$, $G_{3b}$, $G'_{1b}$, $G_{2a}$, $G'_{2a}$, $G_{2b}$, $G'_{2b}$.

FIG. 4 schematizes in the same way an optimal strategy of shots in the case where N=3 and in this case, each sequence comprises the following shots:

$G_{1a}$, $G'_{3a}$, $G'_{2a}$, $G_{1b}$, $G'_{3b}$, $G'_{2b}$, $G_{3a}$, $G_{2a}$, $G'_{1a}$, $G_{3b}$, $G_{2b}$, $G'_{1b}$.

It appears that a more rapid acquisition of the image can be obtained by diminishing the number of focal zones since four lines of a sequence are acquired with simply twelve bursts against sixteen previously. The counterpart and this rapid acquisition is obviously a lesser lateral definition in certain areas of the image, or a smaller exploration depth.

Furthermore, FIG. 5 schematizes a strategy of bursts according to the principle of the invention in the case where N=2, each sequence thus comprises the following bursts:

$G_{2a}$, $G_{1a}$, $G'_{2a}$, $G'_{1a}$, $G_{2b}$, $G_{1b}$, $G'_{2b}$, $G'_{1b}$.

This strategy of bursts revealed the most efficient sequence in order to allow acquisition of the image as rapidly as possible at the given diaphony rate. Indeed, other than the time separation of the bursts, a spatial separation is realized at about half the length of the strip. Nevertheless, according to the invention, there is a derogation from this general principle when proceeding with the acquisition of a portion of line in the most distant focal zone. Indeed, it was found that the echoes created beyond this last focal zone have undergone such an attenuation that they cannot interfere with other echoes corresponding to beams subsequently generated and focalized on other focal zones. This is the reason for which, after having acquired the echoes corresponding to a last focal zone along a given direction, it is possible to acquire immediately the echoes corresponding to the next focal zone in the same direction, thus without passing from one group of elements to the other. This permits the saving each time (i.e. four times per sequence) of commutation time from one group to the other, with only the delay law being modified. Under these conditions the known emission recurrence principle with a much lower diaphony rate can be applied, especially in view of European patent application No. 0 031 510 where a given beam is emitted after a time shorter than the time necessary for an echo, formed at the limit of the most distant focal zone, to return to alignment 11 to be collected. In most cases, each new beam can be emitted at the end of an interval of, theoretically, the shortest time, i.e. at the end of the time necessary for the return of an echo formed at the limit of the focal zone corresponding to the preceding beam. In practice, it will always be possible, except if this focal zone is the closest to the alignment 11 (zone I). In this case (i.e. after the shots $G_{1a}$, $G_{1b}$, $G'_{1a}$ and $G'_{1b}$, for N=4) it will often be necessary, in order to conserve a low diaphony rate, to delay by a predetermined supplementary time interval the moment of the emission of the beam that follows the emission of a beam corresponding to the closest focal zone. This supplementary time will be however less long, other things being equal, by reason of the spatial separation of the consecutive beams generated successively from two selected groups G and G'. Return times are, in all cases, easy to determine since they depend on known parameters such as the propagation speed of the ultrasounds in the structure to be displayed (function of the ultrasound frequency chosen) and the limits of the different focal zones. It should be noted from this point of view that the boundaries of the different focal zones can only be taken into consideration as data at reception while only retaining as significant the signals received between the two instants which corresponding respectively to the return times of the echoes formed at the limits of the focal zone chosen (temporary windowing).

According to another characteristic of the invention, the microangulation value is different in function for the focal zone involved. More specifically, the microangulation is smaller as the corresponding focal zone is positioned further from alignment 11 ($\alpha 1 > \alpha 2$, cf, FIG. 1). Indeed, as the image is reconstituted from a sweeping of parallel lines on the displaying screen, it is preferable to adapt per each time, the microangulation to the distance of the focal zone. This is to avoid interference of the corresponding image at the overlapping of the data collected, by ensuring that the emitting beam strays as little as possible from the direction normal to the alignment in its "useful" portion. For example, for each focal zone it is possible to choose a value of the microangulation, exemplified by converging shots (of types a and b) in two directions from two adjacent groups shifted by only one transducer element, crossing only at the limit or beyond the focal zone.

FIG. 6 shows the general arrangement of an image system intended to operate the process defined hereinabove. Each transducer element 12 is connected to an emitter 30, known per se, transmitting at each excitation, an impulse of duration corresponding to the half-period of the ultransonic frequency chosen. The transducer element is further coupled to controlled receiving circuit 32 (controlled analog switches, for example). Since the selected groups are formed of sixteen elements, sixteen control circuits 34 are required. Each of the control circuits, when addressed, energizes certain transducer element with a predetermined delay. Under these conditions, for a strip of 79 elements (according to an embodiment currently preferred), it is possible to associate five transducer elements to each control circuit 34. For example, on FIG. 6, the first, seventeenth, thirty-third, forty-ninth and sixty-fifth elements have been regrouped. The five corresponding emitters 30 are connected to the outputs of a demultiplexer 36 and the five inputs of the receiving control circuits 32 are connected to the outputs of a demultiplexer 38 (the connections of control circuits 32 are shown in broken lines). The identical signal outputs of the five receiving circuits 32 are all connected to the input of a preamplifier 40. The demultiplexers are addressed in order to excite one emitter among five at each shot and to validate simultaneously and solely the corresponding receiving circuit 32. Each control circuit 34 further comprises shaping means 42 (trigger, for example) of a control impulse, which is transmitted by a connection 43. The output of the shaping means 42 is applied to the input of an adder 44 that also receives the output signal of the preamplifier 40. The output of this adder 44 is connected to the input of a first delay line 46 with eight outputs respectively connected to the eight inputs of a first multiplexer 48. The output of this latter is connected to the input of a second delay line 50 having seven outputs respectively connected to the seven inputs of a second multiplexer 52. The available delays at the outputs of line 46 go from 0 to 70 nanoseconds per step of 10 nanoseconds while the delays available at the outputs of line 50 are from 0 to 480 nanoseconds per step of 80 nanoseconds. It is thus possible to obtain any delay between 0 and 550 nanoseconds, with a precision of 10 nanoseconds, by the simple addressing of multiplexers 48 and 52. The ouput of the multiplexer 52 is connected, on the one hand, to an input of an adding amplifier SOM, that has as its other inputs the corresponding outputs of the other circuits 34, and, on the other hand, to the actuation input 60 of an impulse generator 62, which elaborates at each shot an excitation impulse delayed by a required time interval. The excitation impulse is transmitted to one of the five emitters 30 via demultiplexer 36. The duration of this impulse (which is equal, as indicated hereinabove, to a half-period of the ultrasonic frequency used) is determined by control computer means (connection 64). Generator 62 is defined as a kind of programmable duration monostable. An address generator 66 controls the two multiplexers 48 and 52 (addressing connections 67 and 68). The control computer means comprises a program-memory Mp. The instructions corresponding to a given sequence resulting from the combination of parameters are chosen by the operator from program memory Mp, through the intermediary of a control assembly, such as for example a keyboard K connected to the processor Pr. The program-memory controls the address generator 66 as well as the demultiplexers 36 and 38 of each circuit 34. The parameters displayed by the operator are: the frequency of the ultrasonic waves, the number of focal zones and their limits. From these parameters, the processor organizes a certain number of instructions of the program-memory for governing the rhythm of the ultrasonic shots, the successive delay laws, the useful portions to be retained for display, the wait time between two shots, the gain corrections in terms of the depth of the focal zone, taking into account the attenuation of these echoes and the values of microangulation, etc. For the excitation of each transducer element, the processor emits a burst order (transmitted on the connection 43) that is delayed in terms of the previous positioning of the multiplexers 48 and 52. This order actuates the impulse generator 62, the duration of this impulse being controlled by the program-memory Mp via coupling 64. At reception, the echoes transmitted by the validated circuit 32 undergo the same delays (amplifier 40 connected to the input of the delay line 46) before being summed by the SOM amplifier, thus realizing a "focalization" at the reception. When the elements of the group must be inhibited for the focalization in a close focal zone of the strip, the address generator 66 grounds the output stage of the multiplexer 52, so that generator 62 is not actuated. The output signals of the SOM amplifier are processed, especially "windowed", prior to being used as video signals of a television receiver on which the image is reconstituted line by line.

Of course, the present invention is in no way limited to the specific process described hereinabove and even less to the positioning of the software that has been described, which admits a large number of variants available to the man skilled in the art. It comprises all the technical equivalents, if these are understood as being comprised in the following claims.

We claim:

1. In a method of acquiring signals representative of an internal portion of a structure and of displaying said signals as an image having the steps of:
selecting two groups of adjacent transducer elements in respective two sections of an alignment of transducer elements;
emitting from said alignment of transducer elements bursts of ultrasonic focalized beams to said structure;
receiving from said structure echoes corresponding to said ultrasonic focalized beams;
repeating said emitting of bursts of ultrasonic focalized beams and said receiving of corresponding echoes therefrom for several successive sequences;
differentiating by at least one transducer element for said two selected groups of adjacent transducer elements for each new sequence of said successive sequences, said differentiating effecting a propagating of said two selected groups along said respective sections; said method comprising:
formulating for said emitting step a predetermined number of ultrasonic focalized beams from said two selected groups according to a predetermined succession of different focal patterns, said focal patterns being chosen from N possible focal patterns corresponding, respectively, to N possible focal zones of different depths parallelly defined in front of said alignment, said N being a chosen integer;
generating bursts of said predetermined ultrasonic focalized beams alternately from one of said two selected groups to the other when a given ultrasonic focalized beam does not correspond to the focal zone positioned furthest from said alignment of transducer elements, and
generating two successive bursts of said predetermined ultrasonic focalized beams from the same one of said two selected groups when the first of said predetermined ultrasonic focalized beams corresponds to the focal zone positioned furthest from said alignment of transducer elements.

2. The method according to claim 1, wherein said step of generating two successive bursts of ultrasonic focalized beams further comprises:
focussing the second of said two successive bursts in substantially the same direction but with a focal pattern corresponding to the focal zone adjacent to said focal zone positioned furthest from said alignment.

3. The method according to claim 1, wherein said step of generating bursts of ultrasonic focalized beams further comprises:
focussing, for each group of said transducer elements chosen at each sequence, said bursts during said sequence substantially according to two possible directions, said directions being substantially symmetrical with respect to a normal direction of said alignment and forming a small angle with respect to it.

4. The method according to claim 3, wherein said formulating step further comprises:
equating the number of said N possible focal zones to three;
associating, respectively, three focal patterns to said three focal zones; and
predetermining the limits of said N possible focal zones.

5. The method according to claim 3, wherein said formulating step further comprises:
equating the number of said N possible focal zones to two;
associating, respectively, two focal patterns to said two focal zones; and
predetermining the limits of said N possible focal zones.

6. The method according to claim 1, wherein, in a given sequence, said repeating step is variable, and wherein said repeating step further comprises:
emitting at least one burst of a given beam after a time shorter than the time necessary for an echo formed at the limit of said focal zone positioned furthest from said alignment to return to said alignment.

7. The method according to claim 6, wherein said repeating step further comprises:
emitting, for focal zones not positioned closest to said alignment, each burst of said ultrasonic focalized beams at the end of the time necessary for the return of an echo formed at the limit of the focal zone corresponding to the preceding beam.

8. The method according to claim 7, wherein said repeating step further comprises:
delaying by a supplementary time the emitting of the beam which follows a preceding beam corresponding to the focal zone positioned closest to said alignment.

9. The method according to claim 1, wherein said formulating step further comprises:
equating the number of said N possible focal zones to four;
associating, respectively, four focal patterns to said four focal zones; and
predetermining the limits of said N possible focal zones.

10. The method according to claim 1, wherein said step of generating bursts of ultrasonic focalized beam further comprises:
generating, in each of said selected group, a beam corresponding to a focal zone positioned further from said alignment from a greater number of transducer elements than a beam corresponding to a focal zone positioned closer to said alignment.

11. The method according to claim 10, further comprising:
equating said possible N focal zones to four, said four focal zones being associated with four respective focal beam patterns;
equating said selected group of transducer elements to sixteen;
utilizing all sixteen of said transducer elements for generating beams associated with said focal zone positioned furthest from said alignment;
utilizing twelve of said transducer elements for generating beams associated with the focal zone adjacent to said focal zone positioned furthest from said alignment; and
utilizing eight of said transducer elements for generating respective beams associated with the remaining two focal zones.

12. The method according to any one of claims 3—10, further comprising:
decreasing the value of said small angle as the corresponding focal zone becomes more distant from said alignment.

* * * * *